United States Patent [19]
Grossman et al.

[11] Patent Number: 5,870,554
[45] Date of Patent: Feb. 9, 1999

[54] SERVER SELECTION METHOD WHERE A CLIENT SELECTS A SERVER ACCORDING TO ADDRESS, OPERATING SYSTEM AND FOUND FRAME FOR REMOTE BOOTING

[75] Inventors: Leonid Grossman, Cupertino; Sherman Lee, Rancho Palos Verdes, both of Calif.

[73] Assignee: Advanced Micro Devices, Inc., Sunnyvale, Calif.

[21] Appl. No.: 626,683

[22] Filed: Apr. 1, 1996

[51] Int. Cl.$^6$ ...................................................... G06F 9/40
[52] U.S. Cl. ................. 395/200.52; 395/200.51; 395/652; 395/653
[58] Field of Search .................. 395/200.02, 200.05, 395/200.13, 200.17, 652, 653, 200.5, 200.52, 651, 200.51

[56] References Cited

U.S. PATENT DOCUMENTS

| | | | |
|---|---|---|---|
| 4,926,420 | 5/1990 | Shimizu | 370/471 |
| 5,079,768 | 1/1992 | Flammer | 370/349 |
| 5,230,052 | 7/1993 | Dayan et al. | |
| 5,280,627 | 1/1994 | Flaherty et al. | 395/652 |
| 5,349,643 | 9/1994 | Cox et al. | 380/25 |
| 5,404,527 | 4/1995 | Irwin et al. | 395/652 |
| 5,408,507 | 4/1995 | McNamara et al. | 375/371 |
| 5,410,706 | 4/1995 | Farrand et al. | 395/652 |
| 5,530,808 | 6/1996 | Hammond et al. | 395/200.02 |
| 5,574,915 | 11/1996 | Lemon et al. | 395/561 |
| 5,577,210 | 11/1996 | Abdous et al. | 395/200.1 |
| 5,596,723 | 1/1997 | Romohr | 395/200.16 |
| 5,613,148 | 3/1997 | Bezviner et al. | 395/200.33 |
| 5,627,766 | 5/1997 | Beaven | 364/551.01 |

FOREIGN PATENT DOCUMENTS 06332716  12/1994  Japan ............................... G06F 9/445

OTHER PUBLICATIONS

IBM Corporation, IBM Token–Ring Network Remote Program Load Version 1.0, *User's Guide*, Release 1.0, 1993.

IBM Technical Disclosure Bulletin, vol. 37, No. 3, 1 Mar. 1994, pp. 395–398, XP000441516 "Local Area Network Diagnostics for a Remote Program Load Environment".

*Primary Examiner*—Parshotam S. Lall
*Assistant Examiner*—Gautam R. Patel
*Attorney, Agent, or Firm*—Sawyer & Associates

[57] ABSTRACT

A method for choosing a particular server on a network and performing a remote boot by a client, the network including a plurality of servers operating in accordance with a plurality of network operating systems, includes identifying each of the plurality of servers by address and by type of operating system, and selecting one of the identified servers by address and type for booting on the network. Identifying further includes sending a FIND frame from the client to the network, and receiving a FOUND frame from each of the plurality of servers. A remote program load protocol followed by the server according to the FOUND frame is determined.

Additionally, choosing a particular server on a network and performing a remote boot by a client includes identifying each of a plurality of servers according to characteristics of a FOUND frame including a frequency characteristic, selecting one of the identified servers, and performing a remote program load by a boot ROM on a client through the selected one of the identified plurality of servers. Identifying further includes determining whether a destination address of the FOUND frame is repeated in a same order in a data portion of the FOUND frame, wherein when the destination address is repeated in a same order, a frequency characteristic of the FOUND frame is determined.

24 Claims, 3 Drawing Sheets

5,870,554

SERVER SELECTION METHOD WHERE A CLIENT SELECTS A SERVER ACCORDING TO ADDRESS, OPERATING SYSTEM AND FOUND FRAME FOR REMOTE BOOTING

FIELD OF THE INVENTION

This invention relates generally to server identification and selection, and more specifically to identification and selection of a desired server among multiple types and numbers of servers on a network.

BACKGROUND OF THE INVENTION

Among network protocols is a protocol known as remote program load (RPL) protocol. RPL protocol, originally developed by IBM, allows workstations, such as Heathcliff workstations, to connect to a network and download an operating system from a remote server for configuration on the network. The workstation typically employs a boot ROM on a network adapter card that stores the necessary RPL protocol information, thus allowing the workstation to operate with the network. Thus, the RPL protocol facilitates the use of less expensive workstations on the network.

Although originally developed by IBM, various implementations of the RPL protocol have been developed by other companies for use with their network software, including Novell and Microsoft, two major network system software companies. The variations among these implementations create difficulties, since the workstations cannot blindly attach to a network, but must first identify existence of an appropriate server type on the network to correspond with the implementation addressed by the boot ROM in the workstation.

In prior network configurations, typically only one server of a particular type was available. As networks developed, more than one server existed on the network, but typically only one of each server type appeared on a single network. A block diagram example of such a network is illustrated in FIG. 1. A client workstation 10, such as a Heathcliff workstation, on a network having a plurality of servers, including a Novell server 12, an IBM server 14, and a Microsoft server 16, typically boots to a first available server of an appropriate type for connecting to the network and performing the remote program load. It should be appreciated that server type as used herein refers to the type of system and network operating software and corresponding RPL protocol in use by the server.

Typically, identification and selection begins when a client 10 sends a FIND frame to the network. In response to the FIND frame, the servers 12, 14, 16 each return a FOUND frame. From the FOUND frame, an example of which is shown in FIG. 2, a determination as to the type of server sending the FOUND frame is performed. The example of a FOUND frame in FIG. 2 includes a six byte field of destination address (the client's address), a six byte field of source address (the server's address), a two byte field identifying the packet type, and the data portion of the frame. Once the FOUND frame is received by the client, selection occurs to allow the workstation to boot to the first responding server of a needed type. Conventionally, the FOUND frame from a Novell server has a distinctive 'signature' in the data portion of the FOUND frame at an offset from the packet type field of the frame. Thus, if the 'signature' is not present, the server type is not Novell. A determination of whether the frame is IBM or Microsoft is suitably performed by comparing the data in the destination address field with the data in the data portion at some offset. An IBM server typically reverses the destination address, while the Microsoft server reproduces the destination address.

With the ability to connect to a network using such techniques, there was usually no need to identify which particular server was being selected for booting. Problems develop, however, in the continued use of these techniques with ever-growing network sizes. Currently, networks tend to have multiple servers of each particular type on a network. Merely booting from a first responding server of a particular type is not guaranteed to allow the workstation access to the network, since the server may not be configured for use with that particular client.

A need exists for a method and system for remote booting to a network with multiple servers of multiple types to allow identification and selection of any one of the multiple servers on the network by a client using a boot ROM.

SUMMARY OF THE INVENTION

The present invention addresses these needs. In one aspect of the present invention, a method for choosing a particular server on a network and performing a remote boot by a client, the network including a plurality of servers operating in accordance with a plurality of network operating systems, includes identifying each of the plurality of servers by address and by type of operating system, and selecting one of the identified servers by address and type for booting on the network. Identifying further includes sending a FIND frame from the client to the network, and receiving a FOUND frame from each of the plurality of servers. A remote program load protocol followed by the server according to the FOUND frame is determined.

Determining the protocol followed includes determining whether an identifying signature mark is located at a particular offset in a data portion of the FOUND frame. When the identifying signature mark is located, the server is identified as a first server type, where the first server type is a Novell server. Determining further includes determining whether a destination address of the FOUND frame is repeated in reverse order in a data portion of the FOUND frame. When the destination address is repeated in reverse order in the data portion of the FOUND frame, the server is identified as a second server type, the second server type being an IBM server operating under IBM LAN Server 3.x operating software.

Determining further includes determining whether a destination address of the FOUND frame is repeated in a same order in a data portion of the FOUND frame, wherein when the destination address is repeated in a same order, a frequency of the found frame is determined. When the frequency matches a frequency associated with a first frequency, the server is identified as a third server type, wherein the first frequency is an IBM frequency and the third server type is an IBM server operating under IBM LAN Server 4.x operating software. When the frequency does not match the frequency associated with the first frequency, the server is identified as a fourth server type, the fourth server type being a Microsoft RPL Based Server.

Identifying further includes forming a database table to store the address and type of operating system of each server, while selecting further includes choosing a particular one of the servers according to the stored address and operating system in the database table.

In a further aspect of the present invention, choosing a particular server on a network and performing a remote boot by a client includes identifying each of a plurality of servers according to characteristics of a FOUND frame including a frequency characteristic, selecting one of the identified servers, and performing a remote program load by a boot ROM on a client through the selected one of the identified plurality of servers. Identifying further includes determining whether a destination address of the FOUND frame is repeated in a same order in a data portion of the FOUND frame, wherein when the destination address is repeated in a same order, a frequency characteristic of the FOUND frame is determined. The frequency characteristic then allows distinguishing between an IBM server operating under IBM LAN Server 4.x operating software and a Microsoft RPL Based Server. Identifying also includes determining if an identifying signature mark is located at a particular offset in a data portion of the FOUND frame, wherein when the identifying signature mark is located, the server is identified as a Novell server type. Additionally, identifying includes determining whether a destination address of the FOUND frame is repeated in reverse order in a data portion of the FOUND frame, wherein when the destination address is repeated in reverse order in the data portion of the FOUND frame, the server is identified as an IBM server operating under IBM LAN Server 3.x operating software.

With the information of server type and address stored in a database in accordance with present invention, selective choosing of a desired server is readily accomplished. The selection avoids problems associated with merely trying to boot with the first server responding of a particular type, and allows an appropriate server to be specifically selected to access the network. These and other advantages of the aspects of the present invention will be more fully understood in conjunction with the following detailed description and accompanying drawings.

DETAILED DESCRIPTION OF THE INVENTION

The present invention relates to server identification and selection on a network. The following description is presented to enable one of ordinary skill in the art to make and use the invention and is provided in the context of a patent application and its requirements. Various modifications to the preferred embodiment and the generic principles and features described herein will be readily apparent to those skilled in the art.

Figure 3:
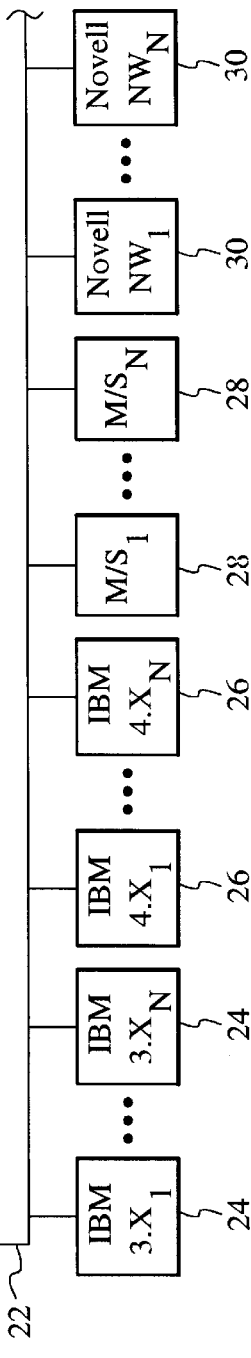
FIG. 3 illustrates a block diagram of a network in accordance with the present invention.

The present invention provides a method to allow specific identification and selection of a desired server from a plurality of servers and server types on a single network. A block diagram example of such a network is illustrated in FIG. 3. As shown, a client workstation 20 is coupled to a network 22, the network 22 including multiple servers 24–30. The servers include, for example, IBM servers 24 operating with IBM LAN Server 3.x operating software, IBM servers 26 operating with IBM LAN Server 4.x operating software, Microsoft RPL Based Servers 28, and Novell servers 30 operating with Novell Netware software. Of course, the number and types of servers shown by FIG. 3 are meant to be illustrative and not restrictive, so that other numbers and types of servers are capably included without departing from the present invention. Suitably then, the network 22 includes local area networks (LANs), wide area networks (WANs), and the internet.

Figure 4:
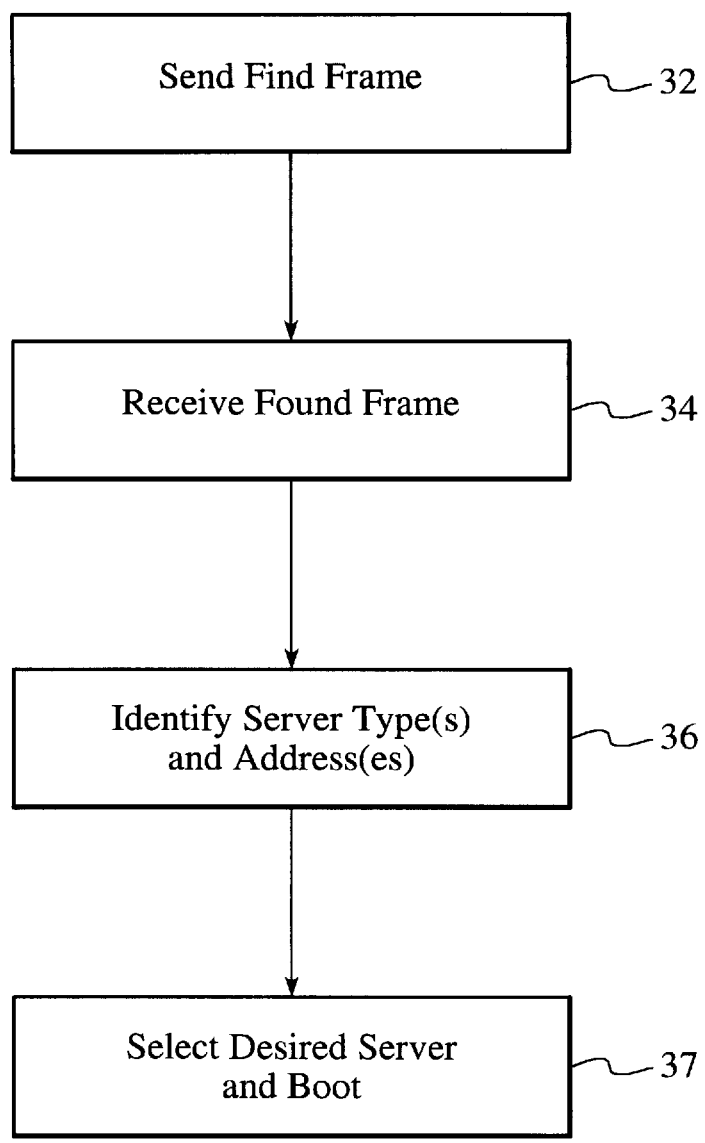
FIG. 4 illustrates a block flow diagram of a method of identification and selection of a server type and address in accordance with the present invention.

In accordance with the present invention, the client 20 employs a boot ROM 21 on a network adapter to perform a remote load of an operating system from a chosen server of the plurality of servers 24–30 to allow the client 20 to connect to and utilize the server network 22. An overall flow diagram of a method for selection is illustrated in FIG. 4.

In general, initiation of selection suitably occurs when the client sends a FIND frame to the network 22 (step 32). Each of the servers 24–30 responds to the FIND frame by sending FOUND frame (step 34). The client 20 then identifies server types and addresses (step 36), which is described in more detail hereinbelow with reference to FIG. 5. Once the server types and addresses are identified, the desired server of the desired type is selected by the client 20 (step 37) for performing the remote boot.

Figure 1:
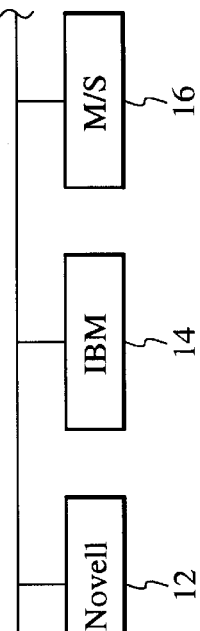
FIG. 1 illustrates a block diagram of a conventional network.
Figure 2:
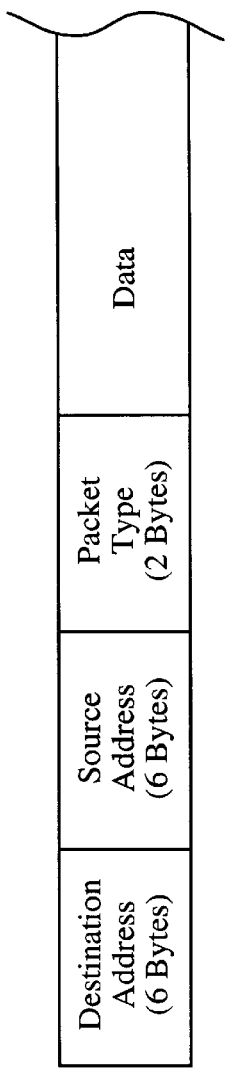
FIG. 2 illustrates an example of a FOUND frame.
Figure 5:
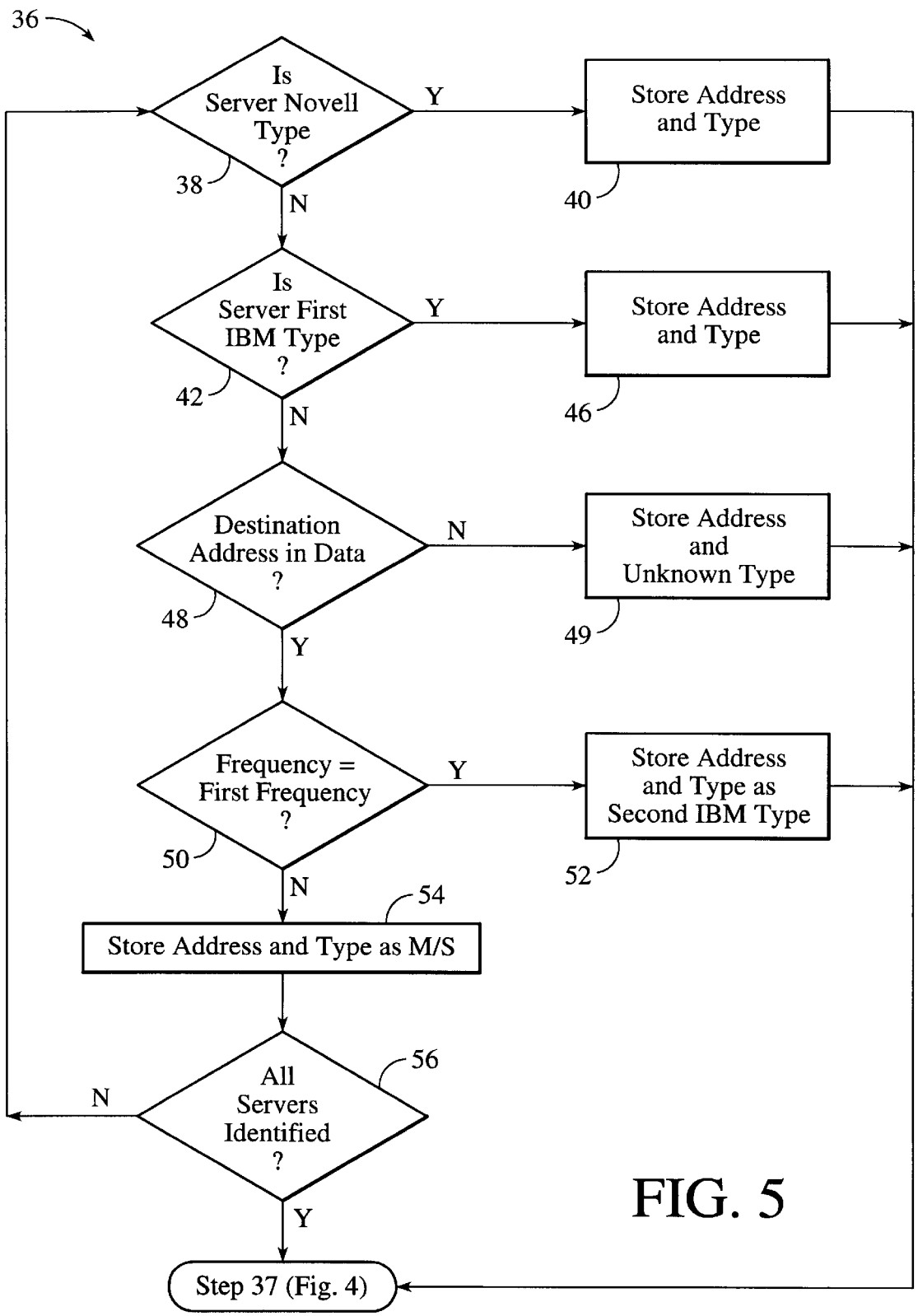
FIG. 5 illustrates a block flow diagram of the step of identifying server types from FIG. 4 in greater detail.

In identifying the server types and addresses (step 36), the present invention takes to advantage characteristic features of the FOUND frame (see FIG. 2) sent by each server type. In FIG. 5, a flow diagram of determination and identification of each server type according to the FOUND frames is illustrated. It should be appreciated that although the following description of FIG. 5 is presented in a particular order of determination and identification steps, the order is illustrative and alterable upon the needs of a particular system. Further, the identification of server types via the FOUND frames preferably results from a comparison of the specifications associated with each server software type and resultant discovery of the unique features of each for implementing the RPL protocol.

The determination and identification process suitably initiates with a determination of whether the server type is Novell, via step 38. As mentioned previously, the FOUND frame of a Novell server has a distinctive, signature mark at some offset in the data portion. Thus, identification in step 38 of the signature mark, e.g. "NOV$", indicates the server type as Novell OPI Server. If the server type is Novell, the source address from the FOUND frame along with an indication that the server type is Novell is preferably stored in a database, via step 40. The database for storing such information is suitably stored in a cache table of a memory unit, e.g., a RAM, of client 20, as is well appreciated by those skilled in the art.

If the server type is not determined to be Novell, the process continues with a determination of whether the server type is IBM, via step 42. For IBM servers operating under IBM LAN Server 3.x operating software, it has been found that the destination address from the FOUND frame is present in reverse order in the data portion at some offset. Thus, if the reverse-ordered destination address is present in the FOUND frame, the server is identified as a first IBM type server, and the type and the source address from the FOUND frame are stored in the database, via step 46. If the reverse-ordered destination address is not identified, the process continues with a determination of whether the destination address is duplicated in the data portion, via step 48. If not, the address of the server and identification as an unknown server type is made, via step 49. If so, the server type must then be identified between a Microsoft RPL Based Server (28) and an IBM server (26) operating under IBM LAN Server 4.x operating software, since both server types include the feature of duplicating the destination address in the data portion. Use of the frequency of the transmission of the FOUND frame as a distinguishing feature between these two types of servers has been found by the inventors to work well and is preferably used to identify the server type. Thus, a determination is made via step 50 of whether the frequency of the FOUND frame matches the frequency of transmission for an IBM LAN Server 4.x, the frequency of transmission being approximately 1 MHz. If so, the server type and address of the server are identified as IBM LAN Server 4.x, via step 52. If not, the server type is identified as a Microsoft RPL Based Server, and the server address and type are stored, via step 54. Upon storage of the server type and address, via step 40, step 46, step 49, step 52, or step 54, the process continues by determining whether all of the servers on the network have been identified, via step 56. Once all of the servers are identified, the formation of the database of information for selecting an appropriate server is completed.

With the information of server type and address stored in a database in accordance with present invention, the client 20 can selectively choose a desired server for connecting to the network. This selection may be suitably performed by displaying a list on a display device (not shown) of the client 20 and allowing a user to pick one from the list. Alternatively, the selection may be performed automatically by preprogramming a particular server of a particular type that will be selected for booting upon its identification in accordance with the present invention. The selection avoids problems associated with merely trying to boot with the first server responding of a particular type, which may or may not be the appropriate server to allow the client access to the network. Thus, the selectivity provided by the present invention ensures that the client will successfully connect to the network.

Although the present invention has been described in accordance with the embodiments shown, one of ordinary skill in the art will recognize that there could be variations to the embodiment and those variations would be within the spirit and scope of the present invention. For example, the identification and selection of the present invention may be suitably provided in a computer readable medium, such as a floppy disk, through which a client successfully attaches to a network. In addition, with the use of the present invention in an internet-type environment, clients may include systems such as Sun Java systems. Accordingly, many modifications may be made by one of ordinary skill without departing from the spirit and scope of the present invention, the scope of which is defined by the following claims.

What is claimed is:

1. A method for choosing a particular server on a network and performing a remote boot by a client, the network including a plurality of servers operating in accordance with a plurality of network operating systems, the method comprising the steps of:
   the client identifying each of the plurality of servers by address and by type of operating system; and
   the client selecting one of the identified servers by address and by type of operating system and the frequency character of a FOUND frame for remote booting on the network by the selected one of the servers.

2. The method of claim 1 wherein the step of identifying further comprises sending a FIND frame from the client to the network, and receiving a FOUND frame from each of the plurality of servers.

3. The method of claim 2 wherein the step of identifying further comprises determining a remote program load protocol followed by the server according to the FOUND frame.

4. The method of claim 3 wherein the step of determining further determines if an identifying signature mark is located at a particular offset in a data portion of the FOUND frame.

5. The method of claim 4 wherein when the identifying signature mark is located, the server is identified as a first server type.

6. The method of claim 5 wherein the first server type is a Novell server.

7. The method of claim 3 wherein the step of determining further determines whether a destination address of the FOUND frame is repeated in reverse order in a data portion of the FOUND frame.

8. The method of claim 7 wherein when the destination address is repeated in reverse order in the data portion of the FOUND frame, the server is identified as a second server type.

9. The method of claim 8 wherein the second server type is an IBM server operating under IBM LAN Server 3.x operating software.

10. The method of claim 3 wherein the step of determining further determines whether a destination address of the FOUND frame is repeated in a same order in a data portion of the FOUND frame.

11. The method of claim 10 wherein when the destination address is repeated in a same order, a frequency of the FOUND frame is determined.

12. The method of claim 11 wherein when the frequency matches a frequency associated with a first frequency, the server is identified as a third server type.

13. The method of claim 12 wherein the first frequency is an IBM frequency and the third server type is an IBM server operating under IBM LAN Server 4.x operating software.

14. The method of claim 12 wherein when the frequency does not match the frequency associated with the first frequency, the server is identified as a fourth server type.

15. The method of claim 14 wherein the fourth server type is a Microsoft RPL Based Server.

16. The method of claim 1 wherein the step of identifying further comprises forming a database table to store the address and type of operating system of each server.

17. The method of claim 16 wherein the step of selecting further comprises choosing a particular one of the identified servers according to the stored address and operating system in the database table.

18. A method for choosing a particular server on a network and performing a remote boot by a client, the network including a plurality of servers operating in accordance with a plurality of network operating systems, the method comprising the steps of:
   the client identifying each of a plurality of servers by address and by type of operating system according to characteristics of a FOUND frame including a frequency characteristic;
   selecting one of the identified severs; and
   performing a remote program load by a boot ROM on the client through the selected one of the identified plurality of servers.

19. The method of claim 18 wherein the step of identifying further comprises determining whether a destination address of the FOUND frame is repeated in a same order in a data portion of the FOUND frame, wherein when the destination address is repeated in a same order, a frequency characteristic of the FOUND frame is determined.

20. The method of claim 19 wherein when the frequency characteristic matches a frequency characteristic associated with an IBM frequency characteristic, the server is identified as an IBM server operating under IBM LAN Server 4.x operating software.

21. The method of claim 20 wherein when the frequency does not match the frequency characteristic associated with the IBM frequency characteristic, the server is identified as a Microsoft RPL Based Server.

22. The method of claim 18 wherein the step of identifying further comprises determining if an identifying signature mark is located at a particular offset in a data portion of the FOUND frame, wherein when the identifying signature mark is located, the server is identified as a Novell server type.

23. The method of claim 18 wherein the step of identifying further comprises determining whether a destination address of the FOUND frame is repeated in reverse order in a data portion of the FOUND frame, wherein when the destination address is repeated in reverse order in the data portion of the FOUND frame, the server is identified as an IBM server operating under IBM LAN Server 3.x operating software.

24. A computer readable medium containing program instructions for choosing a particular server on a network and performing a remote boot by a client, the network including a plurality of servers operating in accordance with a plurality of network operating systems, the program instructions comprising:

the client identifying each of a plurality of servers by address and by type of operating system according to characteristics of a FOUND frame including a frequency characteristic;

selecting one of the identified servers; and performing a remote program load by a boot ROM on a client trough the selected one of the identified plurality of servers.

\* \* \* \* \*